Figure 10:
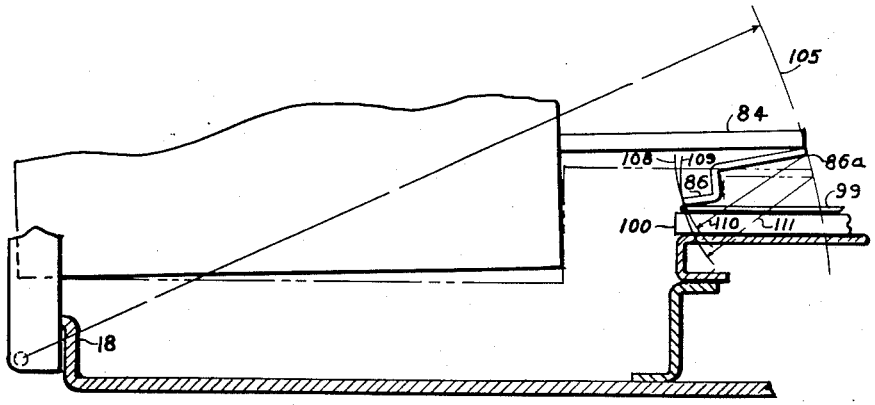

Sept. 7, 1954  H. B. EGING  2,688,716
ELECTRIC CONTROL CENTER
Filed Sept. 18, 1951  3 Sheets-Sheet 1

INVENTOR.
Henry B Eging

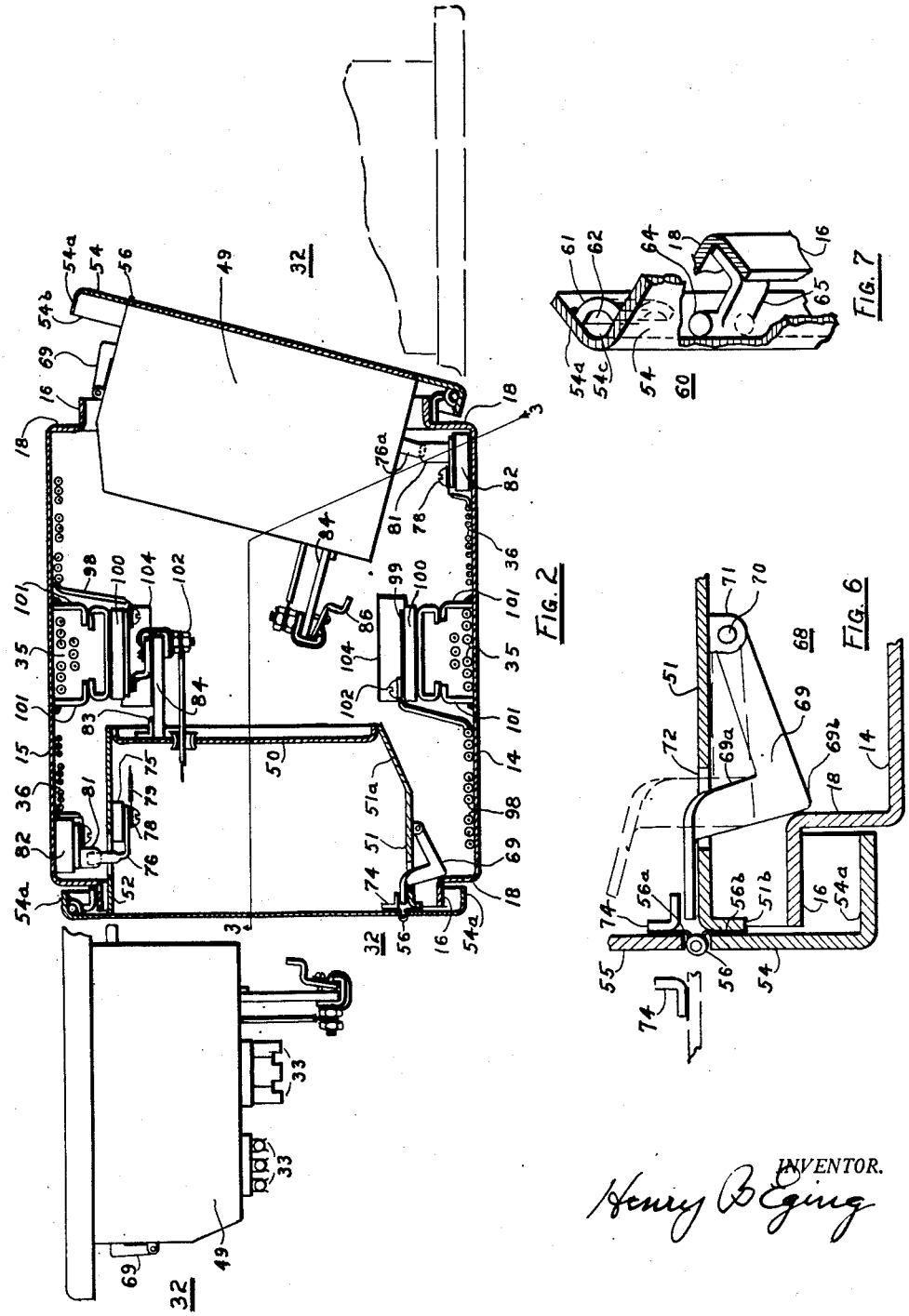

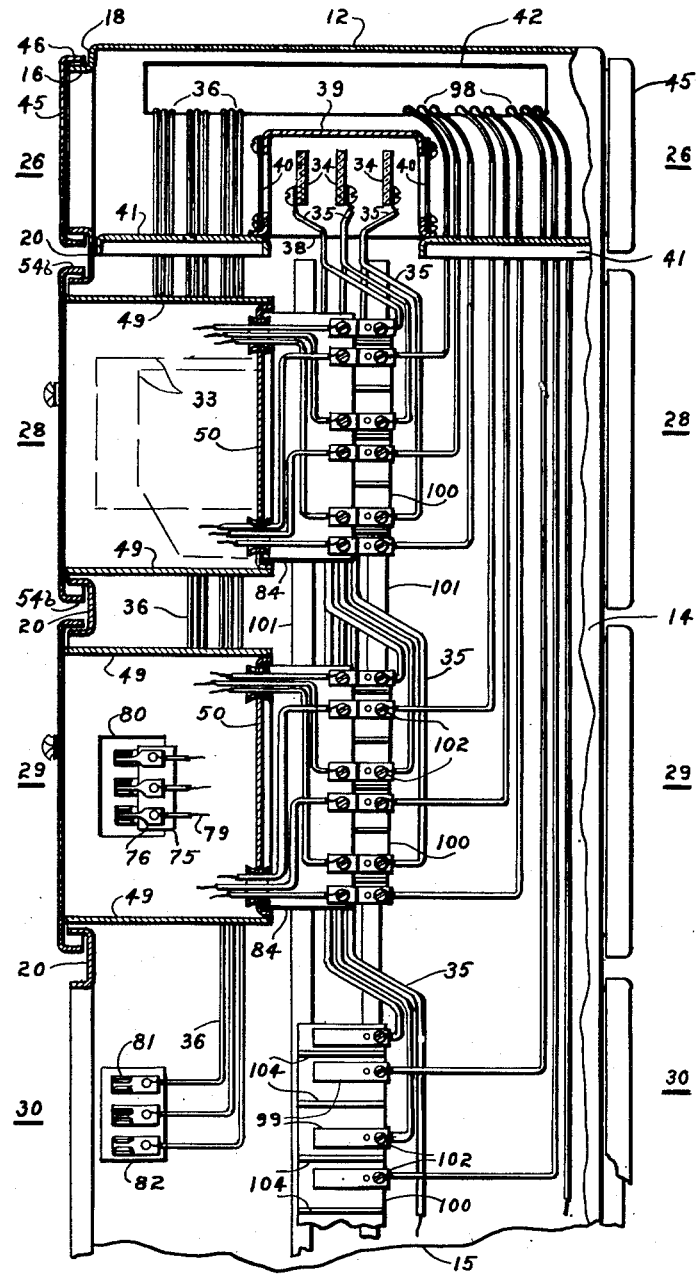

Patented Sept. 7, 1954

2,688,716

UNITED STATES PATENT OFFICE 2,688,716

ELECTRIC CONTROL CENTER

Henry B. Eging, Shaker Heights, Ohio

Application September 18, 1951, Serial No. 247,050

14 Claims. (Cl. 317—120)

This invention relates to an electric control center and more particularly to an improved individual control unit therefor, to an improved housing for a plurality of such control units, and to an improved cooperative relation between the control units and the housing.

An electric control or load distribution center is a localized or centralized assemblage of individual control units for controlling and segregating the distribution of electric power from a main bus structure to a plurality of separate loads which might be widely spaced, and, as commonly used in industrial plants, comprises an integrated group of electric control units such as, for example, electric motor starters, lighting control units, and similar electrical protective and switching equipment.

Although considerable simplification has been made recently in the design of individual control units for electric control centers, the prior control units still have many disadvantages. Furthermore, the prior housings for groups of the control units have many disadvantages and there is a need for an improved cooperative relation between the individual control units and their common housing. For example, the prior individual control units such as motor starters which are to be grouped and mounted in a unitary housing cannot be completely pre-wired because of numerous circuit connections which can only be completed by separate connection of the outgoing and incoming conductors after the starters are mounted entirely within or at least partially within the housing. Also, in those instances where provision has been made for opening the power circuits for a control unit upon removing the control unit from its housing, it has heretofore been necessary to use blade type contacts which are incapable of safely opening the power circuit under load and which also have other electrical and mechanical disadvantages. In addition, in such prior control centers, the cooperative relation between the control units and their housing is such that an adequate gap is not insured at the disconnect contacts.

A further disadvantage of prior control centers is that the wiring from the top or bottom of the housing or cabinet to the individual control units has been very complicated and has been located in ducts in a so-called scrambled fashion without adequate freedom of access. In addition, prior control centers have been so constructed that not only is considerable time required to remove a faulted control unit from the housing and install a new control unit in its place, but also such replacement of a faulted control unit has been accompanied by great risk of a severe fault on the power system as well as physical injury to the workmen.

Other disadvantages of prior control centers are the excessive time required to install a complete control center in the field, the difficulty of locating electrical faults, and the fact that two additional electrical connections for each of the incoming and outgoing conductors are required when master terminal boards are used. Such terminal boards are use to reduce the time required to install a control center in the field.

It is an object of this invention to provide an improved control center not having the foregoing disadvantages.

Another object is to provide a control center having an improved contact structure for completing the power connections from the incoming or supply busses to the individual control units and from the individual control units to the outgoing or load conductors.

Another object is to provide a control center in which the control circuits for each of the individual control units thereof are made and interrupted by blade type contacts operated by swinging movement of the control unit.

Another object is to provide a control center in which the power circuits for each of the individual control units thereof may be opened under load and with a double-break by swinging the control unit from its operative position toward an inoperative position.

A further object is to provide a control center in which the power circuits of an individual control unit thereof are completed by butt-type, spring-biased contacts which are closed as a result of a swing-in movement of the control unit as it is swung on hinges into its operative position.

A further object is to provide a control center in which the power circuits of an individual control unit thereof are interrupted by butt-type, spring-biased contacts which are opened as a result of a swing-out movement of the control unit as it is swung on hinges out of its operative position.

Another object is to provide a control center in which both the power and control circuits for the individual control units thereof are opened upon outward swinging movement of the individual control units and in which the control circuits for any one of the control units may be maintained for testing purposes while the power circuits for that control unit are in a safe interrupted condition.

Another object is to provide a control center having its individual control units arranged to be swung in and out selectively to engage and disengage spring-biased, butt-type contacts.

Among other objects are to provide a completely prewired housing or cabinet unit for a control center in which all incoming and outgoing circuits are connected to or disconnected from the individual control units by suitable switches which function upon swinging movement of the respective control units, to provide a control center in which the individual control units thereof are held in assembled position in the housing without the use of screws or bolts, and to provide an improved hinge structure for each of the individual control units of a control center.

Further objects are to provide a cabinet or housing unit for a control center which has adequate and readily accessible space for all necessary wiring while requiring only a relatively small floor area, and to provide an improved control center in which individual control units can be installed or removed without disturbing any wiring.

Figure 9:
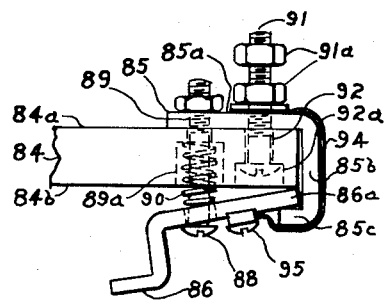
Figure 8:
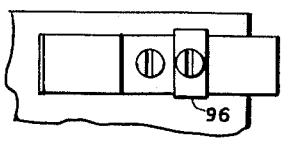
Figure 1:
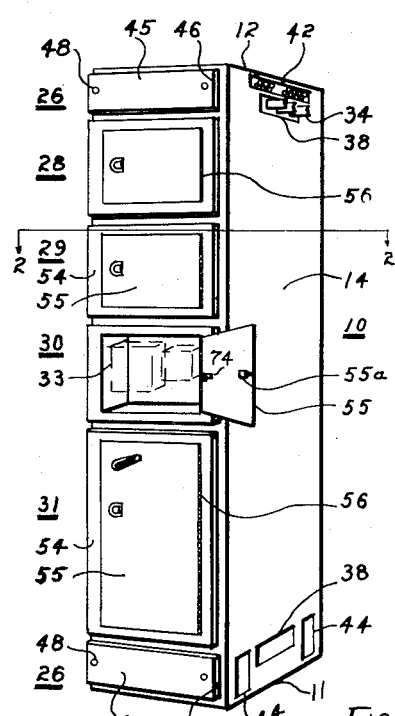
Figure 4:
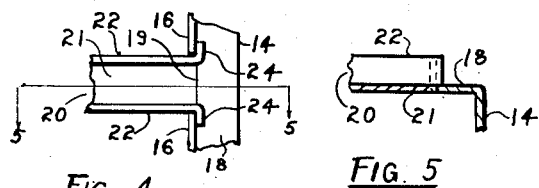
Figure 5:
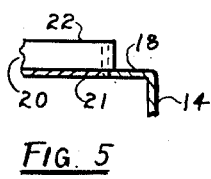

Other objects and advantages will become apparent from the following description wherein reference is made to the drawings, in which;

Fig. 1 is a perspective of a control center in accordance with this invention,

Fig. 2 is a sectional view taken generally along the line 2—2 of Fig. 1 with various ones of the individual control units in different positions, Fig. 3 is a fragmentary side elevation of the upper half of the unit of Fig. 1 and partly in section as indicated by the line 3—3 of Fig. 2, Fig. 4 shows a detail of cabinet bracing, Fig. 5 is a sectional view taken generally along the line 5—5 of Fig. 4, Fig. 6 is an enlarged horizontal sectional view showing the latch mechanism illustrated in smaller scale in Fig. 2, Fig. 7 is an exploded perspective view of a preferred hinge structure, Fig. 8 is an enlarged top view of one of the movable butt-type contacts, Fig. 9 is a view looking at the side of Fig. 8, and Fig. 10 is a schematic view illustrating the operation of the butt-type power circuit contacts.

Referring principally to Figs. 1, 2, and 3, a housing or cabinet unit for a control center chosen to illustrate the present invention comprises a cabinet structure 10 including a bottom wall 11, a top wall 12, and a pair of opposite side walls 14 and 15 joined together in any suitable manner. Both the front and rear edge portions of the walls 11, 12, 14, and 15 are off-set inwardly to define respective front and rear substantially continuous flange portions 16 each parallel to and spaced inwardly from the plane of the respective wall portions and connected thereto by an angularly disposed portion 18 normal to the plane of the respective walls.

Both the front and rear flange portions 16 of the side walls 14 and 15 are cut away at vertically spaced locations to define a plurality of horizontally aligned pairs of slots, one slot of a pair being shown at 19 in Fig. 4. Each pair of slots may receive respective end portions of an outwardly turned, channel-shaped cross-brace 20. As shown most clearly in Figs. 4 and 5, each of the cross-braces 20 has a vertical side wall 21 and slightly longer opposing horizontal top and bottom walls 22 which extend beyond the side wall 21 at opposite ends where they are bent away from the longitudinal axis of the channel to define respective upwardly and downwardly turned ear portions 24.

The walls 22 of the cross-braces 20 fit snugly between the opposing edges of the respective slots 19 with the side walls 21 aligned with the angularly disposed portion 18 and with the ear portions 24 in sliding engagement with the outer face surface of the flange portion 16 adjacent the respective slots 19. Thus the cross-braces 20 impart rigidity to the cabinet 10 while still being readily removable to permit free access to the interior of the cabinet.

When the cross-braces 20 are in position, they define a top area 26, a similar bottom area 26′, and a plurality of vertically aligned intermediate areas 28, 29, 30 and 31 (Figs. 1 and 3) each of which intermediate areas may receive a front and rear one of a plurality of individual control units 32 to be described. In the cabinet unit illustrated, the three upper intermediate areas 28, 29, and 30 are of identical size and the lower intermeditae area 31 is twice as large. Any other desired spacing of the cross-braces 20 may be used to subdivide the cabinet unit. Any two of the smaller units 32 may be interchanged with the larger unit 32 without adjustment except for relocating of the proper ones of the cross-braces 20.

The uppermost area 26 and the lowermost area 26′ define space for a plurality of power busses 34 and for connection thereto of internal incoming power leads 35 and also space for the grouping of control leads 36. Either the uppermost area 26 or the lowermost area 26′, or both, may be used for this purpose, but in the illustrated embodiment only the uppermost area 26 is so used.

The power busses 34 are received in a rectangular opening 38 in the side wall 14 and may pass through the uppermost area 26 in which case they pass through an aligned opening 38 in the side wall 15. As shown best in Fig. 3, the busses 34 are covered in the area 26 by an inverted channel member 39 held by opposing side wall members 40 formed of expanded metal and disposed on opposite sides of the busses 34. The side wall members 40 are carried by respective channel members 41 secured respectively to the front and rear cross-braces 20 which define the lower boundary of the uppermost area 26 and are spaced at opposite ends from the respective side walls 14 and 15 to provide space for the control leads 36.

The opposing side walls 14 and 15 of the cabinet unit 10 also have respective aligned rectangular openings 42 above the respective openings 38 to permit control wiring to pass in and out of the unit 10. Similar groups 44 of rectangular openings are provided in lower portion of the side walls 14 and 15 in the region of the area 26′ to provide space for control wiring and power busses (not shown) to enter and leave the lowermost area 26′ of the cabinet unit 10, the latter openings being closed by suitable blocking plates (not shown) if desired.

It will be understood that a complete control center may include a plurality of the cabinet units 10 arranged in side by side relation with the openings 38, 42, and 44 thereof aligned so that the busses 34 and control leads 36 may extend from unit to unit through the areas 26 or 26′ thereof.

Suitable closure members 45 having a continuous peripheral inturned flange 46 are secured as by screws 48 to the portion 18 of the cabinet unit 10 at the front and rear of the area 26, respectively. A pair of similar closure members 45 are provided to close the front and rear of the lowermost area 26′ as well. When the closure units 45 are in position, the flanges 46 thereof are spaced outwardly from the adjacent portion of the flange 16 and the wall 22 of one of the cross braces 20 to leave space for suitable gaskets (not shown).

As mentioned, each of the intermediate areas 28, 29, 30 and 31 may receive a front and rear control unit 32. The six control units 32 in the upper areas 28, 29, and 30 are shown as of the same size and the two control units 32 in the lowermost area 31 are indicated as being of double size. Each of the control units 32 carries one or more well known control elements 33 which perform the desired control function. For clarity of illustration, the control elements 33 have been omitted from some of the control units 32 and in some instances have been indicated only in outline. Although the individual control elements 33 of the several control units 32 may be different, the structure of each of the control units 32 apart from the control elements 33 are identical except for size. Accordingly, a detailed description of one of the control units 32 will suffice for all.

Each of the control units 32 comprises a generally rectangular box having top and bottom walls 49, a removable rear wall 50, side walls 51 and 52 and a front wall 54. The box may be formed in any suitable manner, but preferably the rear wall has rearwardly turned peripheral flanges which are detachably secured to the walls 49, 51, and 52. The side wall 51 has a slanting portion 51a to provide mechanical clearance as will become clear.

The front wall 54 comprises a box-like member having opposing side flanges 54a spaced outwardly from the side walls 51 and 52 and opposing top and bottom flanges 54b spaced outwardly from the top and bottom walls 49. Preferably, the junction between the side flanges 54a and the front 54 is a curved surface 54c.

When any one of the control units 32 is in its closed position, the top and bottom flange portions 54b thereof are received between the top and bottom walls 22 of adjacent ones of the cross braces 20, respectively, and the side flanges 54a thereof are received outside of the respective flanges 16. Space is thereby provided for suitable gaskets (not shown).

The front wall 54 has a large central opening which may be closed by a suitable door 55 supported by a hinge 56 and having a suitable latch 55a. Preferably the hinge 56 is of the piano type and has one portion 56a secured to the door 55 and another portion 56b secured between the front wall 54 and an outwardly turned flange 51b of the side wall 51 as clearly shown in Fig. 6.

Each of the control units 32 is hinged to the cabinet 10 by a pair of vertically aligned hinge structures 60 of improved construction and shown best in Fig. 7. Each of the hinge structures 60 comprises a curved member 61 welded at its respective end edges to the front wall 54 and one of the side flanges 54a thereby to form a vertically directed opening or socket 62. The socket 62 is defined on one side by a portion of the curved surface 54c and on the other side by a face surface of the curved member 61 which preferably is approximately a one-quarter segment of a hollow cylinder. Thus the socket 62 is oblate in horizontal cross-section but approximately a circle.

Each of the hinge structures also comprises a cylindrical pin 64 complementary to one of the openings 62. A bracket 65 extending outwardly from a lower side portion of the pin 64 is bent intermediate of its length and is welded at its portion removed from the pin 64 to the flange 16 and angle portion 18 of the cabinet 10. The inner end portion of the pin 64 is parallel to the angle portion 18 so that the pin 64 is held in spaced relation with respect to the flange 16 and angle portion 18.

Each of the control units may be mounted on the cabinet 10 by placing the vertically aligned members 61 slightly above their respective complementary pins 64 with the pins 64 in sliding engagement with the curved surface 54c and then lowering the unit 32 so that the pins 64 enter their respective openings 62. When the unit 32 is in position, the lower edge surface of each of the members 61 is in contact with the upper edge surface of its associated ones of the brackets 65. The control unit 32 now may be swung in a horizontal plane through an arc of 90 degrees from a fully open position shown in Fig. 2 to a closed position also shown in Fig. 2.

The use of a pair of hinge structures 60 such as just described provides many advantages. The hinge structure is extremely sturdy, comprises but two parts, and is invisible when the control unit 32 is in its closed position. Since the pins 64 need extend but a very short distance above the upper face of the bracket 65, the units 32 may be closely spaced since only a small elevation of the unit 32 from its attached position is necessary for installation or removal. It is a simple matter to place the curved surface 54c defined by the junction of the front wall 54 and the flange 54a against the outer curved surface of the pins 64 which insure proper alignment for reception of the uppermost portion of the pin 64 in the opening 62. Also, it is not necessary that any precise angular relation between the unit 32 and cabinet 10 be maintained when installing or removing a control unit.

Each of the control units 32 is preferably held in closed position by a latch structure 68 shown most clearly in Fig. 6. Each of the latch structures 68 comprises a Z-shaped bar 69 pivoted at 70 on a bracket 71 carried by the side wall 51. An intermediate portion 69a of the bar 69 is received in an opening 72 in the side wall 51. When the control unit 32 is almost in its closed position, an edge portion 69b of the bar 69 engages the flange 16 and the bar 69 is rotated clockwise about its pivot as viewed in Fig. 6. When the control unit 32 is in its fully closed position, the bar 69 is free to swing counterclockwise so that the portion 69a is free to move inside of the angle portion 18. The bar 69 may be held in this position by a bracket 74 secured to the portion 56a of the hinge 56.

Each of the control units 32 has a control terminal board 75 formed of suitable insulating material mounted on its side wall 52. Each of the terminal boards 75 carries a plurality of vertically spaced knife blades 76 secured thereto by screws 78 which may also be used to secure respective internal control wires 79 into good electrical contact with the respective knife blades 76. Outwardly turned portions 76a of the knife blades 76 are twisted or otherwise formed so that their opposing flat surfaces lie in a horizontal plane and pass through an opening 80 in the side wall 52. When each of the control units 32 approaches its closed position, the blade portions 76a of the blades 76 thereof are received in respective knife blade receptacles 81 secured to an insulating block 82 carried by the side wall 15 in the case of the control units 32 hinged at the front of the cabinet 10 or the side wall 14 in the case of the control units 32 hinged at the rear of the cabinet 10. Thus there is a block 82 with its associated receptacles 81 on the wall 15 within each of the areas 28, 29, 30, and 31 and a similar block 82 with its associated receptacles 81 on the wall 14 within each of the areas 28, 29, 30 and 31. Selected ones of the control leads 36 are electrically secured to the receptacles 81, respectively, along both walls 14 and 15. Thus, when any one of the control units 32 is swung outwardly, all of its external control connections are interrupted at its blades 76 and the receptacles 81 cooperating therewith, and when any one of the control units 32 is swung to its closed position, all of its external control connections are completed at its blades 76 and the receptacles 81 cooperating therewith. As will become apparent, the control connections are interrupted after the power connections and are completed before the power connections.

An angle 83 welded to each of the rear walls 50 of the control units 32 is spaced inwardly a short distance from the side wall 52 thereof and carries an outwardly projecting insulating contact carrying block 84. A plurality of identical movable contact structures shown best in Figs. 8 and 9 are secured at vertically spaced locations along the outer end portion of each of the blocks 84. Since the movable contact structures are identical, a description of one will suffice.

The movable contact structure comprises a generally U-shaped bracket 85 having an elongated leg portion 85a along one side 84a of the block 84, a bight portion 85b turned over the outer end face of the block 84, and a shortened leg portion 85c spaced from but parallel to the other side wall 84b of the block 84. A generally Z-shaped contact 86 preferably formed of copper has the outer end portion of a longer arm portion 86a received in the space between the wall 84b and the leg portion 85c. An opening in the arm portion 86a loosely receives a screw 88 which passes through the block 84 and is threaded into an opening 89 in the leg portion 85a. A helical compression spring 90 surrounding the screw 88 abuts at one end against the arm portion 86a and has its other end received in a counterbore 89a of the opening 89. Thus the spring 90 biases the inner end of the arm portion 86a away from the block 84. A bolt 91 is received in an opening 92 in the block 84 and passes through an aligned opening in the leg portion 85a. The head of the bolt 91 is received in a counterbore 92a of the opening 92. A copper shunt 94 has one end portion received on the bolts 91, is bent around the bight portion 85b and leg portion 85a, and has its other end portion secured to the arm portion 86a by a screw 95 and a U-shaped steel clamp 96. Nuts 91a are threaded on the protruding end of the bolt 91.

As shown most clearly in Fig. 3, each of the blocks 84 carries six of the movable contact structures. Incoming power leads 35 of each of the units 32 are secured to respective ones of the bolts 91 thereof by the nuts 91a and outgoing power leads 98 of each of the units 32 are secured to respective ones of the bolts 91a.

When each of the control units 32 approaches its closed position, the contacts 86 thereof engage a complementary stationary contact plate 99 carried by an insulating block 100 suitably supported on a pair of spaced angles 101 welded to the side wall 15 in the case of the control units hinged at the front of the cabinet 10 or the side wall 14 in the case of the control units hinged at the rear of the cabinet 10. Thus there is an insulating block 100 with its vertically spaced contact plates 99 on the wall 15 within each of the areas 28, 29, 30 and 31, and a similar block 100 with its associated plates 99 on the wall 14 within each of the areas 28, 29, 30 and 31. Selected ones of the power leads 35 which are arranged along the walls 14 and 15 between the angles 101 are electrically secured to the stationary contact plates 99, respectively, as by screws 102. Thus, when any one of the control units 32 is swung outwardly, its incoming and outgoing power connections are interrupted at its contacts 86 and the contact plates 99 cooperating therewith, and when any one of the control units 32 is swung inwardly to its closed position, all of its outgoing and incoming power connections are completed at its contacts 86 and the contact plates 99 associated therewith. It should be noted that a double-break is thus provided in the power connections.

The knife blades 76 and receptacles 81 and the contacts 86 and plates 99 are so positioned relative to the hinges 60 of each of the units 32 that the control connections may be completed while the power connections are interrupted. This facilitates testing of the control elements 33 on the units 32.

To increase the arc rupturing ability of the power contacts, suitable arc barriers 104 may be mounted on the blocks 100 between the contact plates 99 thereof.

Fig. 10 diagrammatically illustrates the operation of the contacts 86 as they engage their associated ones contact plates 99. In Fig. 10, the tip of the movable contact 86 has just touched its associated contact plate 99. As the control unit 32 moves to its fully closed position, the outer end of the contact portion 86a moves along the arc 105 and the contact portion 86a moves toward the block 84 compressing the spring 90. During this movement, the contact tip is relatively stationary on the plate 99 as indicated by the arcs 108 and 109 struck by the radii 110 and 111, respectively. Consequently, there is a good rolling action between the contact 86 and the plate 99 but very little sliding movement, which provides for a good and long wearing contact assembly.

I claim:

1. An electric control center comprising a housing having a vertical side wall, a plurality of spaced stationary contacts carried by said side wall, electrical conductors disposed along said side wall and connected to said stationary contacts, respectively, an individual control unit pivoted at a vertical edge of said side wall for reception into said housing by a horizontal swinging motion about its pivot axis, a plurality of spaced movable contacts on said control unit arranged to engage said stationary contacts, respectively, when the control unit is received in said housing as a result of said swinging motion, and said contacts providing the only path for current flow to and from said control unit.

2. The control center of claim 1 characterized in that said pivot axis is defined by a hinge means which constitutes the sole support for said control unit both in and out of said housing and which maintains said movable contacts in a horizontal path aligned with said stationary contacts.

3. The control center of claim 1 characterized in that there are a plurality of vertically spaced groups of said stationary contacts on said side wall, a plurality of said control units are pivoted at vertically spaced locations along said pivot axis so that, upon said horizontal swinging movement of said control units, said contacts on each of said control units engage a group of said stationary contacts.

4. The control center of claim 1 characterized in that contact pressure springs are associated with said movable contacts, respectively, and are compressed to provide contact pressure by swinging of said control unit into operative position in said housing, and the length of said control unit in a direction away from said vertical edge and said movable contacts being related to the distance between said vertical edge and said stationary contacts so that a mechanical advantage is obtained to compress said springs.

5. The control center of claim 1 characterized in that a plurality of blade type receptacles are spaced along said side wall, and a plurality of blades complementary to said receptacles, respectively, are carried by said control unit and engage said receptacles, respectively, upon reception of said control unit into operative position in said housing.

6. The control center of claim 1 characterized in that said pivot axis is defined by a hinge means which is demountable when said contacts are out of engagement.

7. A control center in accordance with claim 1 characterized in that a second vertical side wall spaced from and substantially paralled to said first side wall has a second group of spaced stationary contacts, electrical conductors disposed along said side wall and connected to said second group of stationary contacts, respectively, a second individual control unit is pivoted at a vertical edge of said second side wall furthest from said edge of said first wall, for reception into said housing by a horizontal swinging motion about its pivot axis, a plurality of spaced movable contacts on said second control unit are arranged to engage said stationary contacts of said second group, respectively, when said second control unit is received in said housing as a result of said swinging motion, and said second group of stationary contacts and said contacts on said second control unit providing the only path for current flow to and from said second control unit.

8. The control center of claim 1 characterized in that said pivot axis is defined by a hinge means comprising a pair of pivot pins disposed in vertical alignment, carried by said side wall, and spaced from said vertical edge of said side wall, and said control unit has a pair of aligned sockets complementary to, and adapted to receive, said pins, respectively.

9. The control center of claim 8 characterized in that said pins are supported, at their lower end portions, by brackets secured to said side wall and have their upper end portions exposed, said control unit has a front wall with an in-turned flange defining angularly related surfaces, said sockets are defined by said surfaces and members, respectively, spaced from said surfaces at their line of intersection, said members being arranged to rest on said brackets to hold said control unit in position for said swinging motion about said pivot axis with the upper ends of said pins received in said sockets, respectively.

10. An electric control center comprising a housing having a vertical side wall, a control unit pivoted at one edge along a vertical edge of said side wall and arranged to be swung about its pivot axis into and out of said housing, two groups of stationary contacts carried by said side wall at respective locations spaced different distances from said edge of said side wall, electrical conductors disposed along said side wall and connected to said stationary contacts, respectively, two groups of contacts on said control unit at respective locations spaced different distances from said edge of said control unit and complementary to said groups of stationary contacts, respectively, and said contacts providing the only path for current flow to and from said control unit.

11. A control center in accordance with claim 10 characterized in that said groups of contacts are so spaced with respect to each other and the pivot axis of said control unit that, upon swinging movement of said control unit about it pivot axis into said housing, the group of stationary contacts closest to said edge of side wall are engaged by its complementary group of contacts on said control unit before the other group of stationary contacts is engaged by its complementary group of contacts.

12. An electric control center comprising a housing having a side wall, a plurality of spaced stationary contacts carried by said side wall, electrical conductors disposed along said side wall and connected to said stationary contacts, an individual control unit arranged for reception into said housing by swinging movement about an axis parallel to a vertical edge of said side wall, a plurality of spaced movable contacts on said control unit arranged to engage said stationary contacts, respectively, when the control unit is swung into in said housing, each of said movable contacts, being pivotally mounted and held by a spring in one position, said swinging movement of said control unit causing engagement of said movable contacts with said stationary contacts and causing compression of said springs and movement of said movable contacts about their respective pivot axes, and said contacts providing the only path for current flow to and from said control unit.

13. An electric control center comprising a housing having a wall, a stationary contact carried by said wall near an edge thereof and having a contact surface parallel to and closely adjacent said wall, an individual control unit having an edge pivoted at a pivot axis parallel to and closely adjacent said edge of said wall so as to be swingable about said axis into and out of said housing, a contact carried by said control unit near said edge of said control unit and arranged to be disengaged from said contact surface when said control unit is swung out of said housing and to engage said contact surface prior to complete reception of said control unit in said housing, and said control unit being elongated in a direction away from said pivot axis whereby force exerted on said control unit at a point remote from said pivot axis exerts an increased force between said contact surface and said contact on said control unit.

14. The control center of claim 13 characterized in that said contact on said control unit is biased away from said control unit by a spring, and said positioning of said contacts with respect to said pivot axis and each other permitting engagement of said contacts at said contact surface just prior to full reception of control unit in said housing and compression of said spring as said force is exerted to swing said control unit fully in said housing.

References Cited in the file of this patent

UNITED STATES PATENTS

| Number | Name | Date |
|---|---|---|
| 1,809,025 | Cruser | June 9, 1931 |
| 1,853,428 | Jackson | Apr. 12, 1932 |
| 2,020,913 | Schramm | Nov. 12, 1935 |
| 2,120,103 | Linde | June 7, 1938 |
| 2,173,062 | Hammerly | Sept. 12, 1939 |
| 2,542,853 | Willis | Feb. 20, 1951 |